D. D. LOCKWOOD.

ELECTRIC LAMP.

APPLICATION FILED AUG. 17, 1910.

Reissued Oct. 18, 1910.

13,158.

2 SHEETS—SHEET 1.

Witnesses
Perry H. Pattison
E. D. B. Brown

Inventor
David D. Lockwood
F. W. Smith Jr
Attorney

D. D. LOCKWOOD.

ELECTRIC LAMP.

APPLICATION FILED AUG. 17, 1910.

Reissued Oct. 18, 1910.

13,158.

2 SHEETS—SHEET 2.

Witnesses

Percy A. Pattison

E. D. B. Brown.

Inventor

David D. Lockwood

F. W. Smith Jr. Attorney

UNITED STATES PATENT OFFICE.

DAVID D. LOCKWOOD, OF BRIDGEPORT, CONNECTICUT.

ELECTRIC LAMP.

13,158. Specification of Reissued Letters Patent. Reissued Oct. 18, 1910.

Original No. 932,621, dated August 31, 1909. Serial No. 471,121. Application for reissue filed August 17, 1910. Serial No. 577,723.

*To all whom it may concern:*

Be it known that I, DAVID D. LOCKWOOD, a citizen of the United States, residing at Bridgeport, in the county of Fairfield and State of Connecticut, have invented certain new and useful Improvements in Electric Lamps; and I do hereby declare the following to be a full, clear, and exact description of the invention, such as will enable others skilled in the art to which it appertains to make and use the same.

My invention relates to electric lamps, but more particularly to that class of such devices known as desk or table lamps, the object of my improvement being to provide a lamp which shall be universally adjustable.

A further object of my invention is to provide a pivoted shade which is disposed and supported in proximity to the open face of the reflector, the pivotal point of support of the shade being located at or about the top thereof, the shade having movement vertically in the arc of a circle, so that its adjustments may be varied in effecting desired control of the flow of light.

With this end in view my invention consists in the combination and arrangement of parts hereinafter fully described and then particularly pointed out in the claims which conclude this description.

Figure 1:
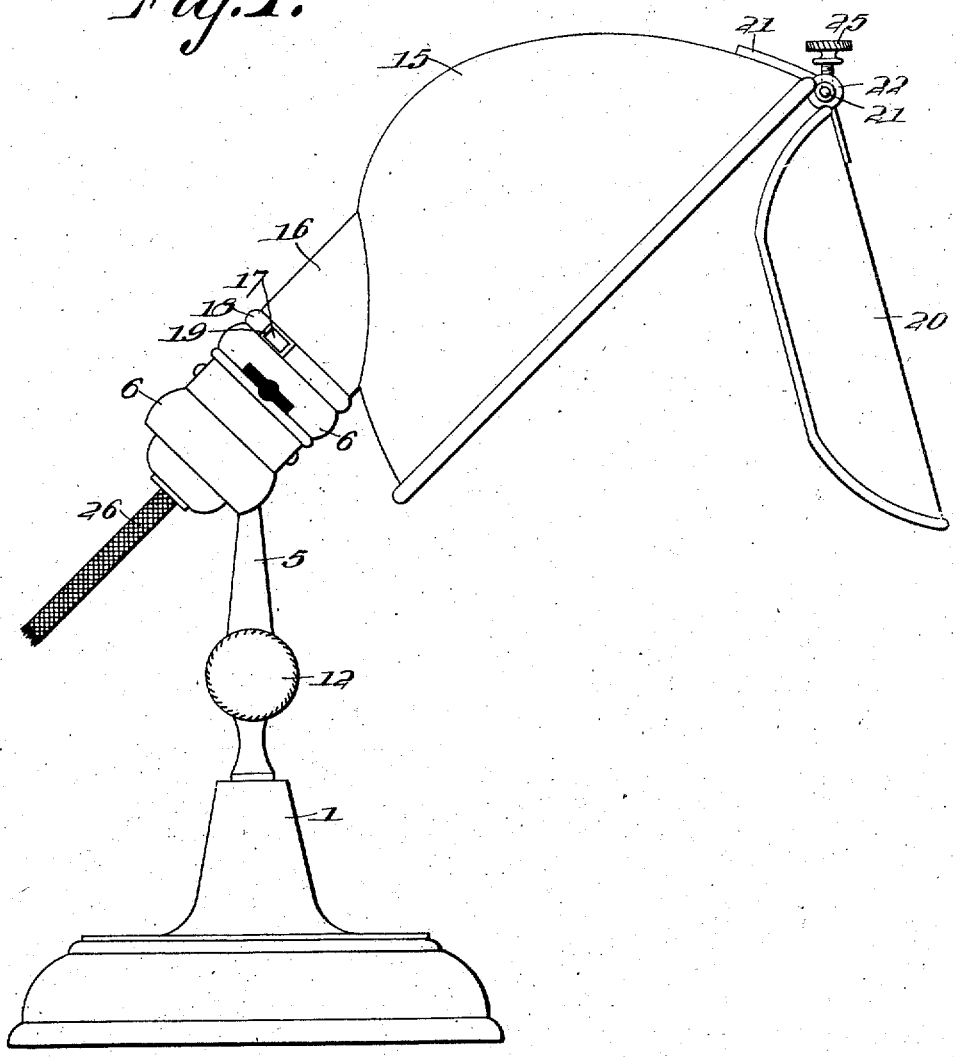
Figure 2:
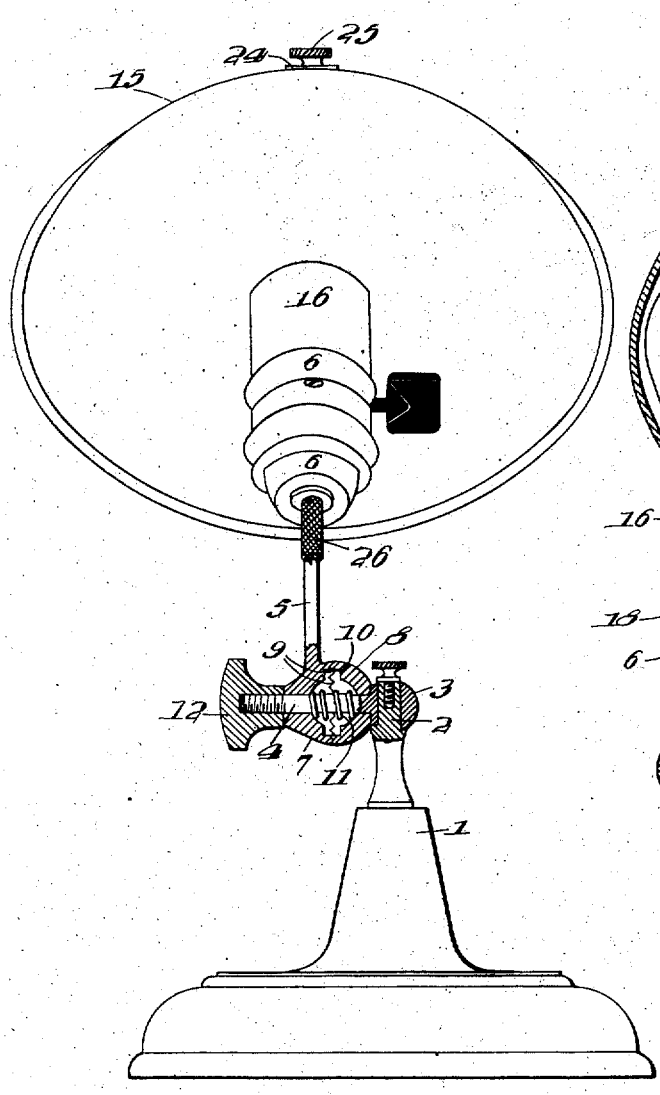
Figure 3:
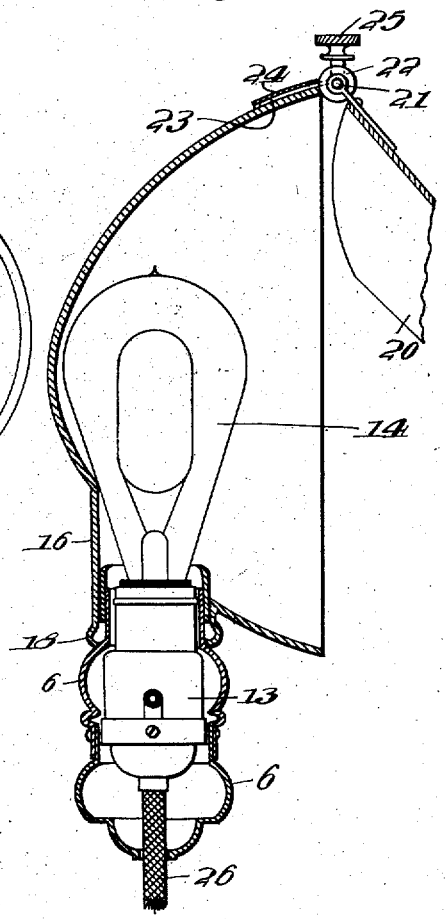

In the accompanying drawing, Figure 1 is a side elevation illustrating my improved lamp, Fig. 2 a rear elevation partly in section, and Fig. 3 a sectional elevation of the socket and reflector portion of my improved lamp.

Similar numbers of reference denote like parts in the several figures of the drawing.

My improvement relates solely to the various adjustments of the parts, hereinafter described, so that the very best results may be obtained from the light itself.

1 is a base or standard terminating at the top in a round stud 2 which latter extends loosely through the head 3 of a horizontally disposed threaded pin 4.

5 is a bracket rigid with the casing 6 of the lamp, which bracket, therefore, supports the entire lamp and all the parts in connection therewith. This bracket at its lower end terminates in a perforated cheek piece 7 which is loose around the pin 4, a similar cheek piece 8 being rigid with said pin and concentric therewith, both of which cheek pieces have engaging teeth 9, 10, respectively, on their contact edges. A spring 11 around the pin 4 and confined within the cheek pieces serves to normally separate the latter so that the bracket 5 will be free to swing in a vertical plane, while a thumb nut 12 driven on the pin 4, serves to clamp the cheek pieces together to hold the bracket in any required adjustment.

The casing 6 contains the usual electric light socket 13 into which the light bulb 14 is inserted in the usual manner.

15 is the reflector of any approved shape the neck 16 of which is attached to the forward part of the casing 6 in such manner as to have a free independent rotary movement. The manner of attaching this neck to the casing is very ordinary and it is quite immaterial how this is done; in the present instance, the casing has a small rib or nub 17 which extends therefrom and which is contained within a hollow bead 18 at the termination of the neck 16, a gate 19 being cut within this bead so as to admit the rib in assembling the reflector and casing.

20 is a shade which has a pintle 21 rigid therewith at its upper edge, and 22 is a head loosely pivoted around said pintle and having extending therefrom a tongue 23 which latter extends within a socket 24 in the upper forward edge of the reflector 15, the friction between said tongue and socket being sufficient to hold these parts together.

25 is a thumb screw extending through the head 22 and adapted to be driven firmly against the pintle 21 whereby the shade may be securely held in any adjustment to which it has been swung.

26 is the usual electrical conductor which extends from the socket 13 through the casing.

In utilizing my improved lamp, the bracket 5 is swung horizontally so as to bring the light at the desired general location, the nut 12 is loosened and said bracket elevated or lowered to bring the light at the proper distance from the surface to be illuminated, the reflector is turned so as to direct the light or to soften or modify the same, while the shade is swung to any required adjustment in order to properly shield the eyes of the user.

As a student lamp my improvement possesses marked advantages since the various adjustments are quickly made, and the combinations that may be effected by utilizing all the adjustments are such that my improvement must necessarily meet the demands of every occasion.

I do not wish to be understood as claiming any novelty in any individual adjustment, since it is the combination of the several adjustments heretofore described that effects the result aimed at by my invention.

Having thus described my invention what I claim as new and desire to secure by Letters Patent is:—

1. In an electric lamp, the combination of the standard, the bracket supported by said standard and having horizontal and vertical swinging adjustments, the lamp casing carried by said bracket, the electric light socket contained within said casing, the reflector mounted upon said casing and having an independent rotary adjustment therearound, and the shade adjustably hinged to said reflector.

2. In an electric lamp of the character described, the combination of the standard, the threaded pin pivoted to the top of said standard and capable of a free horizontal swinging movement, the bracket loosely supported around said pin and capable of a vertical swinging movement, the clamping members carried by said pin and bracket, a spring around said pin and acting normally to disengage said clamping members, a nut driven on said pin whereby said clamping members may be operated, the lamp casing carried by said bracket, the electric light socket contained within said casing, the reflector swiveled upon said casing and capable of independent rotary movement concentric with the casing, and the shade hinged to the upper front edge of said reflector and having a vertical adjustment.

3. In an electric lamp, a reflector, a supporting means for the reflector, and a shade movably carried by said reflector, and means for holding the shade in its adjusted position, said means consisting of a hinged connection between said reflector and shade, a head loosely carried by the hinged connection and a screw extending through the head and binding against said hinged connection to hold the shade in any position it may assume with regard to the reflector.

4. In an electric lamp, a standard, a reflector, means for connecting the reflector and standard whereby the reflector may have a horizontal and vertical swinging movement with respect to the standard, a shade having one end thereof located at the free edge of the reflector, means for pivotally connecting the shade to the reflector, and means to hold the shade rigid against movement about its pivotal point including a screw.

5. In an electric lamp, a reflector, supporting means for the reflector, a shade movably supported from the reflector, and means for holding the shade in adjusted position, said means consisting of a pintle, a head which receives the pintle and a set screw.

6. In an electric lamp, a reflector, supporting means for the reflector, a shade having one end located at the free edge of the reflector, and means to support the shade from the reflector, said means consisting of a pivotal connection having a pair of oppositely disposed parts extending therefrom, one of the parts being secured to the reflector, the other part being secured to the shade.

7. In an electric lamp, a reflector, a shade having one end located at the free edge of the reflector, and means to pivotally and adjustably sustain the shade in position, said means consisting of a member secured to the reflector and having its outer end formed with an eye, a member carried by the shade and having a pintle carried by its outer end which pintle is received in said eye, and means carried by the first member to hold the pintle in any position, to which it may be adjusted.

8. In an electric lamp, a reflector, a shade having one end located at the free edge of the reflector, and means to support the shade consisting of a member having a pair of movably connected and oppositely disposed parts, one of said parts being secured to the reflector and the other of said parts being secured to the shade, and means to hold one of the parts in rigid adjusted position with respect to the other part.

In testimony whereof I affix my signature in presence of two witnesses.

DAVID D. LOCKWOOD.

Witnesses:
F. W. Smith, Jr.,
M. T. Longden.